United States Patent [19]

Matthews

[11] 4,429,997
[45] Feb. 7, 1984

[54] PHASE-LOCKED LOOP LASER GYROSCOPE SYSTEM

[75] Inventor: James B. Matthews, Wayland, Mass.

[73] Assignee: Raytheon Company, Lexington, Mass.

[21] Appl. No.: 221,685

[22] Filed: Dec. 30, 1980

Related U.S. Application Data

[63] Continuation of Ser. No. 890,423, Mar. 27, 1978, abandoned.

[51] Int. Cl.³ .............................................. G01C 19/64
[52] U.S. Cl. .................................................... 356/350
[58] Field of Search ................. 356/350; 331/DIG. 2

[56] References Cited

U.S. PATENT DOCUMENTS

| | | | |
|---|---|---|---|
| 3,469,922 | 9/1969 | Coccoli et al. | 356/350 |
| 3,508,831 | 4/1970 | Macek | 356/350 |
| 3,537,027 | 10/1970 | Smith | 331/94.5 S |
| 3,596,201 | 7/1971 | Chester | 331/94.5 S |
| 3,644,841 | 2/1972 | Smith | 331/94.5 S |
| 3,697,181 | 10/1972 | Macek et al. | 356/350 |
| 3,741,657 | 6/1973 | Andringa | 356/350 |
| 3,807,866 | 4/1974 | Zingery | 356/350 |
| 3,846,025 | 11/1974 | Wilber | 356/350 |
| 3,854,819 | 12/1974 | Andringa | 356/350 |
| 4,039,260 | 8/1977 | Redman | 356/350 |

FOREIGN PATENT DOCUMENTS 52-47706  6/1977  Japan ............................. 331/DIG. 2

OTHER PUBLICATIONS

"How Can You be Sure that Your PLL is Really Locked in", Sharpe, Electrical Design News, vol. 22, No. 4, Feb. 1977, pp. 109-111.

Primary Examiner—Vincent P. McGraw
Attorney, Agent, or Firm—Walter F. Dawson; Richard M. Sharkansky; Joseph D. Pannone

[57] ABSTRACT

A very high resolution laser gyroscope system having a phased-locked loop operatively coupled to one or more frequency difference outputs from a laser gyroscope cavity. Waves of at least four frequencies propagate around the gyroscope cavity, with output signals being formed having a frequency equal to the difference between the frequencies of wave pairs. In one set of embodiments of the invention, the frequency difference signal for one wave pair is phase-locked to an external reference source. A signal applied to a Faraday rotator bias coil provides the frequency shifting of the wave pairs necessary to achieve phase lock. The amplitude of the signal applied to the Faraday bias coil provides a highly precise measure of the rate of rotation. In another set of embodiments of the invention, one or more of the wave pair frequency difference signals are coupled as inputs to an external phase-locked loop in which a voltage controlled oscillator is followed by a frequency divider of the feedback circuit. In these embodiments, the output of the voltage controlled oscillator provides an output signal which has a frequency in proportion to but many times higher than the frequencies of the wave pair difference signals. In still further embodiments of the invention, the two phase-locked loop techniques may be combined. In all of the disclosed systems, the quantization error normally associated with laser gyroscope output signals is substantially reduced.

16 Claims, 8 Drawing Figures

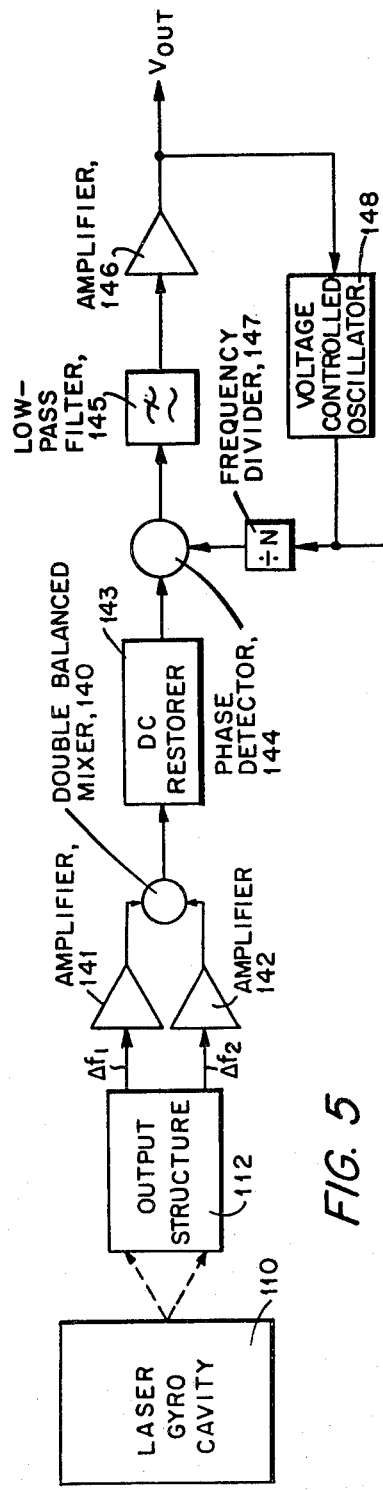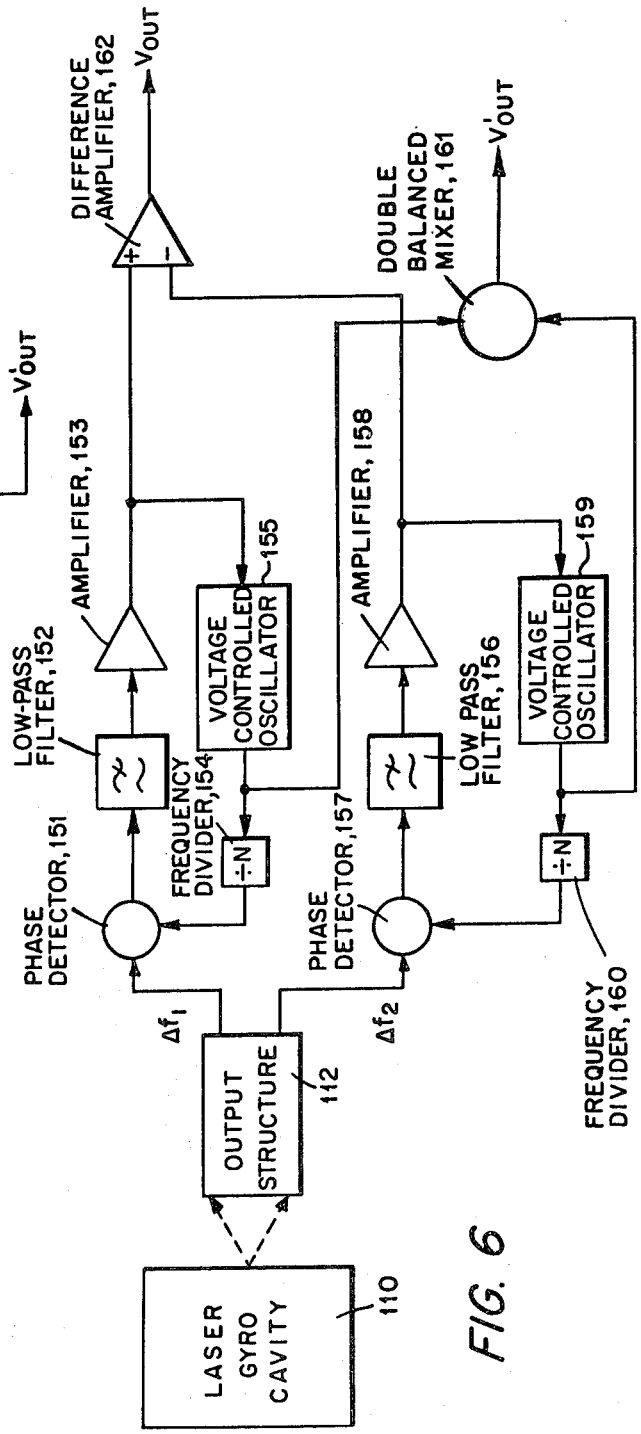

PHASE-LOCKED LOOP LASER GYROSCOPE SYSTEM

CROSS-REFERENCE TO RELATED CASES

This application is a continuation of Ser. No. 890,423, filed Mar. 27, 1978, now abandoned.

BACKGROUND OF THE INVENTION

1. Field of the Invention

The invention pertains broadly to laser gyroscope systems. More particularly, the invention relates to four-frequency laser gyroscope systems in which high precision output signals are required.

2. Description of the Prior Art

One of the primary problems which must be overcome to provide a useful laser gyroscope system is that of mode locking. In an uncompensated system in which no provision is made for overcoming this problem, for low angular rates of rotation, the frequency difference produced between wave pairs circulating in their laser gyroscope cavity are less than would be predicted were not for the mode locking phenomena. In fact, the actual frequency difference output only asymptotically approaches the desired linear relationship between output frequency difference and rate of rotation as the actual rate of rotation is increased.

Numerous laser gyroscope structures have been proposed for eliminating or substantially reducing this mode locking problem. Among the most successful of these systems is that shown and described in the U.S. Pat. Nos. 3,741,657 and 3,854,819, both to Keimpe Andringa and assigned to the present assignee, the specifications thereof being incorporated by reference herein. In the patented systems, beams of four seperate frequencies propagate around a closed laser gyroscope path defined by four mirrors. Two beams circulate in the clockwise direction and two in the counterclockwise direction. Of the two clockwise circulating beams, one is of left-hand circular polarization and the other of right-hand circular polarization as is also the case for the two counterclockwise circulating beams. In the preferred embodiment, the two beams of right-hand circular polarization are of higher frequency than those of left-hand circular polarization. A Faraday rotator structure provides the frequency difference or splitting between the beams of clockwise and counterclockwise rotation while the crystal rotator structure provides the frequency splitting between the beams of right-hand and left-hand polarization.

The relative frequency positions of the beams of four different frequencies are shown in the diagram of FIG. 2. To avoid the mode locking problem, the Faraday rotator provides sufficient frequency splitting between the beams of frequency $f_1$ and $f_2$ as well as between the beams of frequencies $f_3$ and $f_4$ at a zero rate of rotation and for all anticipated rates of rotation such that no mode locking can occur and the system is biased substantially outside the nonlinear region where mode locking occurs.

At rest, the frequency difference between the beams of frequency $f_1$ and $f_2$ is the same as that between the beams of frequencies $f_3$ and $f_4$. As the laser gyroscope system is rotated in a first direction, the beams of frequencies $f_1$ and $f_2$ will move together in frequency while those of $f_3$ and $f_4$ will move apart in frequency by the same amount. For rotation in the opposite direction, the beams of frequency $f_1$ and $f_2$ will move apart in frequency while those of $f_3$ and $f_4$ will move together by the same amount.

To produce an output signal having a frequency in proportion to the rate of rotation, a first two output frequency difference signals having frequencies $\Delta f_1 = f_2 - f_1$ and $\Delta f_2 = f_4 - f_3$ are formed. A final output signal $\Delta f = \Delta f_2 - \Delta f_1$ is then formed. To provide an indication of the total amount of rotation, two counters are provided, one of which is incremented by the $\Delta f_1$ signal and the other by the $\Delta f_2$ signal. The output of one counter is digitally subtracted from that of the other thus providing a digital signal indicative of the total amount of rotation of the system.

Although this system described in the Andringa patents has been found to function quite satisfactorily for numerous applications, in still further applications it has been found desirable to provide an output signal indicating either the amount of rotation or rate of rotation having a higher degree of precision than quantizing the $\Delta f_1$ and $\Delta f_2$ signals at one pulse per cycle of the signals can provide.

SUMMARY OF THE INVENTION

Accordingly, it is an object of the present invention to provide a laser gyroscope system having a highly precise output signal.

Moreover, it is an object of the present invention to provide such a system in which quantization of the output signal is achieved at a much higher rate than straightforward quantization of the normal output signals would provide.

These, as well as other objects of the invention may be met by providing the combination of means for providing a closed-loop path for sustaining propagation of electromagnetic waves of a plurality of frequencies and means for producing a first signal having a frequency equal to a predetermined multiple of the difference in frequency between two of said waves. The multiplicative factor is preferably an integer factor much greater than unity. A second signal is produced which has a frequency equal to the difference in frequency between the two waves. The first signal is phase locked to the second. Phase detecting means is provided with the second signal coupled to the input of the phase detecting means and the output of the phase detecting means being coupled to the means for producing the first signal. Frequency dividing means is also provided which divides the frequency of the first signal to substantially the same frequency as the second signal. The output of the dividing means is coupled as the second input of the phase detecting means to thus form a phase-locked loop.

The invention may further be practiced by providing the combination of means for providing a closed-loop propagation path for sustaining electromagnetic waves of at least four frequencies, means for producing a difference signal having a frequency equal to the difference in frequency between two of the waves, means for producing a signal having a predetermined or fixed frequency, means for producing a control signal having parameters by the difference in phase between the difference signal and the signal having the predetermined or fixed frequency, and means for varying the frequency difference between the two waves as determined by the control signal. In preferred embodiments, the frequency difference between the two waves is maintained at a constant value over at least a predetermined range of rates of rotation of the path providing means. The frequency difference varying means includes means for producing a magnetic field in response to the control signal. The control signal producing means may in turn include phase detecting means the inputs of which are coupled to the means for producing a signal having the predetermined fixed frequency and to the difference signal producing means, low-pass filter means, and amplifying means coupled either to the input or output of the low-pass filter means or the amplifying means and low-pass filtering means being constructed as a single unit. The closed-loop propagation path providing means preferably includes at least four reflecting means, first and second frequency dispersive means disposed in the path, and a laser gain medium.

Objects of the invention may also be met by providing the combination of means for providing a closed-loop propagation path for sustaining propagation of electromagnetic waves of at least four frequencies, means for producing a first difference signal having a frequency equal to the difference in frequency between a chosen first two of the waves, means for producing a second difference signal having a frequency equal to the difference in frequency between a chosen second two of the waves, means for producing a first control signal having a parameter determined by the difference in phase between the first difference signal and the signal having the predetermined fixed frequency, means for varying the frequency difference between the first two of the waves in accordance with the first control signal, means for producing a second control signal having a parameter determined by the difference in phase between the second difference signal and a feedback control signal, and means for producing the feedback control signal in response to the second control signal wherein the feedback control signal has a frequency determined by the second control signal. In the preferred embodiments, the frequency difference varying means maintains the frequency difference between the first two of the waves at a constant value over at least a predetermined range of rates of rotation of the path providing means. The path providing means may include first and second frequency dispersive elements particularly one of which is Faraday rotator body so that the frequency difference varying means may comprise a coil for producing a magnetic field in the Faraday rotator body. The means for producing the first control signal and the means for producing the second control signal may each separately comprise phase detecting means having an input coupled to the corresponding difference signal, low-pass filter means and amplifying means coupled to the low-pass filter means. In the preferred embodiments, the frequencies of the first two of the waves are either both above or below the frequencies of the second two of the waves.

Still further, objects of the invention may be met by providing the combination of means for providing a closed-loop propagation path for sustaining propagation of electromagnetic waves of at least four frequencies, means for producing a first difference signal having a frequency equal to the difference in frequency between a first two of the waves, means for producing a second difference signal having a frequency equal to the difference in frequency between the first and second difference signals, phase detecting means with the third difference signal being coupled to a first input of a phase detecting means, low-pass filter means, amplifying means coupled to the low-pass filter means, amplifying means coupled to the low-pass filter means with the input of the low-pass filter means or amplifying means coupled to the output of the phase detecting means, and means for producing a control signal having a frequency determined by the value of an input parameter with the input of the control signal producing means being coupled to the output of the amplifying means and the output of the control signal producing means being coupled to a second input of the phase detecting means. The means for producing the third difference signal preferably includes means for amplifying the first difference signal, means for amplifying the second difference signal, and a double balanced mixer the inputs of which are coupled to the means for amplifying the first and second difference signals. The control signal producing means comprises a voltage-controlled oscillator and frequency dividing means coupled to the output of the voltage-controlled oscillator.

Still further, the invention may be practiced by providing the combination of means for providing a closed-loop propagation path for sustaining propagation of electromagnetic waves of at least four frequencies, means for producing a first difference signal having a frequency equal to the difference in frequency between a first two of the waves, means for producing a second difference signal having a frequency equal to the difference in frequency between a second two of the waves, first and second phase-locked loops with the first phase-locked loop coupled to the means for producing the first difference signal and the second phase-locked loop coupled to the means for producing the second difference signal. Each of the phase-locked loops includes phase detecting means with the corresponding difference signal being coupled to one input of the phase detecting means, low-pass filter means, and means for producing a control signal having a frequency determined by the value of an input parameter with the control signal producing means being coupled to the output of the amplifying means and with the output of the control signal producing means being coupled to a second input of the phase detecting means. Further, in the combination is included means for producing an output signal having a parameter determined by the difference in frequency between the control signals of the first and second phase-locked loops. The control signal producing means of each of the first and second phase-locked loops has a voltage-controlled oscillator with the input of each being coupled to the output of the amplifying means and the output of each being coupled to an input of the output signal producing means and frequency dividing means the input of which is coupled to the output of the voltage-controlled oscillator and the output of each being coupled to the second input of the phase detecting means. The propagation path in the preferred embodiments includes four or more reflecting means and first and second frequency dispersive elements.

DESCRIPTION OF THE DRAWINGS

FIG. 3-6 are block diagrams of various embodiments of the invention; and

DESCRIPTION OF THE PREFERRED EMBODIMENTS

Figure 1:
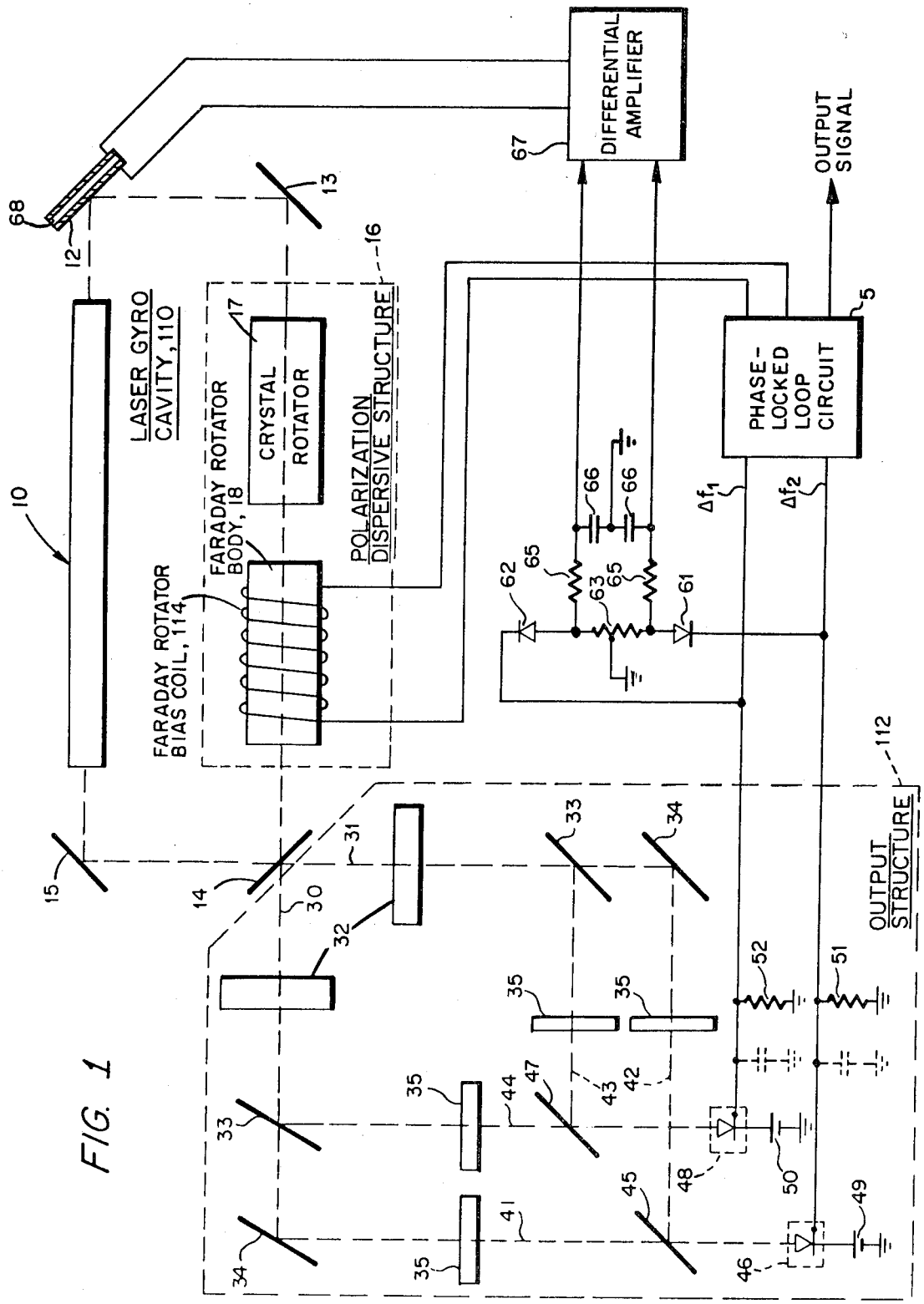
FIG. 1 is a diagrammatic view of a laser gyroscope system in accordance with the invention.
Figure 2:
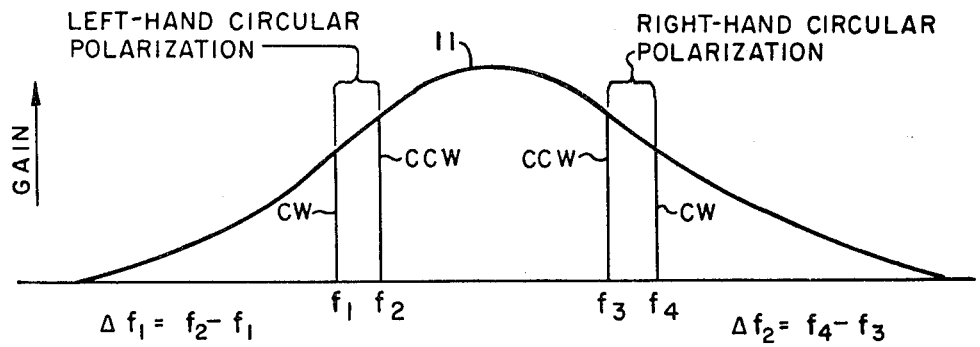
FIG. 2 is a diagram illustrating the frequency line distribution and gain medium characteristics of the laser gyroscope system of the invention.

Referring first to the view of FIG. 1, there is shown therein in diagrammatic form a laser gyroscope system in which the present invention is used to advantage. A generally rectangularly shaped laser gyro cavity 110 is defined by mirrors 12-15. Along one leg of cavity 110 in the path of the electromagnetic waves which propagate around the path is disposed laser gain medium 10. Laser gain medium 10 may be formed as a sealed chamber containing gases such as a mixture of isotiopes of helium and neon. The amount of gain afforded the various electromagnetic waves is, as is well known, a function of frequency of the waves. As shown in the view of FIG. 2, the laser gain curve 11 for the chosen gain medium is substantially bell shaped. Along the leg of laser gyro cavity 110 opposite laser gain medium 10 is disposed polarization dispersive structure 16. Two separate polarization dispersive elements are provided within polarization dispersive structure 16.

Crystal rotator 17 provides a delay or, equivalently, a phase shift, for circularly polarized waves that is different for one sense of circular polarization than for the other. That is, the delay or phase shifts are different for waves or right-hand circular polarization than for those of left-hand circular polarization. Moreover, the delay is reciprocal in that the delay imparted to a particular wave depends only upon its sense of polarization and not upon its direction of propagation through the crystal.

Adjacent crystal rotator 17 within polarization dispersive structure 16 is positioned Faraday rotator 18. Faraday rotator 18 is constructed using either a crystalline or noncrystalline center core through which is applied a constant magnetic field from an external permanent magnet, not shown. Fused quartz is the preferred material. Faraday rotator 18 provides a delay or phase shift which is different for waves propagating through it in one direction than the other. The delay imparted the waves is independent of the sense of polarization. A second magnetic field is produced in the body of Faraday rotator 18 by Faraday rotator bias coil 114. The magnetic field produced by Faraday rotator bias coil 114 may be in either direction depending upon the direction of current flow in the coil. Faraday rotator bias coil 114 forms part of a phase-locked loop circuit 5 as will be described below.

Referring again to the view of FIG. 2, it shows that waves of four distinct frequencies $f_1$, $f_2$, $f_3$, and $f_4$ are produced by the apparatus shown in FIG. 1. The waves of frequencies $f_1$ and $f_4$ are waves propagating in the clockwise direction while the waves of frequencies $f_2$ and $f_3$ are waves propagating in the counterclockwise direction. The waves of frequencies $f_1$ and $f_2$ are left-hand circularly polarized while those of frequencies $f_3$ and $f_4$ are right-hand circularly polarized. As may be appreciated from the description above, the splitting between the left-hand and right-hand circularly polarized beams is caused by crystal rotator 17 while the splitting between the clockwise and counterclockwise beams is produced by Faraday rotator 18.

As the system of FIG. 1 is rotated about its sensitive axis, for a first direction of rotation, the waves of frequencies $f_3$ and $f_4$ move closer together in frequency while those of $f_1$ and $f_2$ move apart in frequency by the same amount as $f_3$ and $f_4$ move together. For the opposite direction of rotation, the waves of frequencies $f_1$ and $f_2$ move closer together in frequency while those of $f_3$ and $f_4$ move apart in frequency again by the same amount.

To produce an output signal indicative of the rate of rotation of the system or, alternatively, of the total amount of rotation since a predetermined time, two different signals $\Delta f_1 = f_2 - f_1$ and $\Delta f_2 = f_4 - f_3$ are formed. At rest, $\Delta f_1 = \Delta f_2$. To form an output signal indicative of the rate of rotation at any particular instant, a second difference signal $f = \Delta f_2 - \Delta f_1$ is formed. To determine the total amount of rotation since a predetermined time, an integral of the f signal is performed. The integral may be formed with an analog circuit but is preferably done digitally for increased accuracy.

The frequency difference signals $\Delta f_1$ and $\Delta f_2$ are produced by output structure 112. Mirror 14 is constructed to be partially transmitting so that a small portion of each of the four waves circulating in laser gyro cavity 110 are passed through the mirror to output structure 112. Clockwise propagating waves pass through mirror 14 along path 30 while the clockwise circulating beam waves are coupled out along path 31. The extracted beams pass through quarter-wave plates 32, the thickness of which is chosen in accordance with well-known principles such that the circularly polarized waves are converted to linearly polarized waves with the linearly polarized waves, corresponding to the waves of right-hand circular polarization, being substantially orthogonal to those corresponding to the waves of left-hand circular polarization.

The linearly polarized waves are split into beams of substantially equal amplitude by half-silvered mirrors 33 and 34. The four beams are then passed through polarization analyzers 35 to produce the four beams at 41, 42, 43, and 44 each of which contains a wave of only one of frequencies $f_1$, $f_2$, $f_3$, and $f_4$ as the polarization analyzers pass only one angle of linearly polarized waves. The waves having frequencies $f_1$ and $f_2$ are shone upon half-silvered mirror 47 and reflected towards detector diode 48 while those of frequencies $f_3$ and $f_4$ are reflected by half-silvered mirror 45 to detector diode 46. Detector diodes 46 and 48 are reversed biased by voltage sources 49 and 50 to produce the desired operating characteristics as is well known in the detector diode art. Detector diodes 46 and 48 produce an output signal which has a frequency equal to the difference in frequency between the two input waves incident upon each diode. The output signals appear across resistors 51 and 52. Higher frequency output signals such as those having a frequency equal to the sum of the frequencies of the incident waves are filtered out by the stray capacitances appearing across each diode and do not form a part of the output signal.

In systems operation, it is desirable that the waves of the four frequencies be centered symmetrically about the peak of the gain curve. To this end, a piezoelectric transducer 68 is provided to mechanically position mirror 12 to adjust the total path length within laser gyro cavity 110 to properly center the four frequencies. To derive a signal for operating piezoelectric transducer 68, signals are formed having an amplitude in proportion to the total amplitudes of the corresponding $\Delta f_1$ and $\Delta f_2$ signals and a difference formed between the two amplitude related signals. The output difference signal of course has a zero amplitude when the waves of the four frequencies are properly centered upon the gain curve. The output difference signal is of one polarity when the four waves are off center in one direction and the opposite plurality when the waves are off center in the other direction. The average amplitude signals are formed by the network including diodes 61 and 62, resistors 63, 64, and 65, and capacitor 66. The output difference signal is formed by differential amplifier 67, the output of which is coupled to the input leads of piezoelectric transducer 68.

In accordance with the principles of the invention, a phase-locked loop circuit 5 receives the input frequency difference signals and from them produces a highly precise output signal representing the rate of rotation of the system or the total amount of rotation or both of these. Also, in the embodiment shown in FIG. 1, phase-locked loop circuit 5 produces a signal coupled to Faraday rotator bias coil 114 for controlling the frequency difference between at least one of the wave pairs. In some embodiments, Faraday rotator coil 18 may be omitted.

Referring next to the block diagram of FIG. 3, the operation of phase-locked loop circuit 5 will be described in more detail. The $\Delta f_1$ frequency difference signal from output structure 112 is coupled to one input of phase detector 116. To the other input of phase detector 116 is coupled the output of reference clock 118. The output signal from phase detector 116 representing the difference in phase between the reference clock signal and $\Delta f_1$ signal is coupled to amplifier 120 through low-pass filter 119. Low-pass filter 119 may alternately follow amplifier 120 or may be incorporated therewith such as in a feedback arrangement. The output of amplifier 120 is coupled back to Faraday bias coil 114 amplified by coil driver amplifier 115.

The signal applied to Faraday bias coil 114 from the output of amplifier 115 causes a magnetic field to be produced in the body of Faraday rotator 18 of FIG. 1 such that the change in frequency of two of the four waves propagating within laser gyro cavity 110 caused by rotation of the system are opposed and nulled out over wide range of rates of rotation. Thus, as the system is rotated, one of the frequency difference signals will not change. However, the rate of rotation will be precisely indicated by the amplitude of the output signal from amplifier 120.

Figure 3:
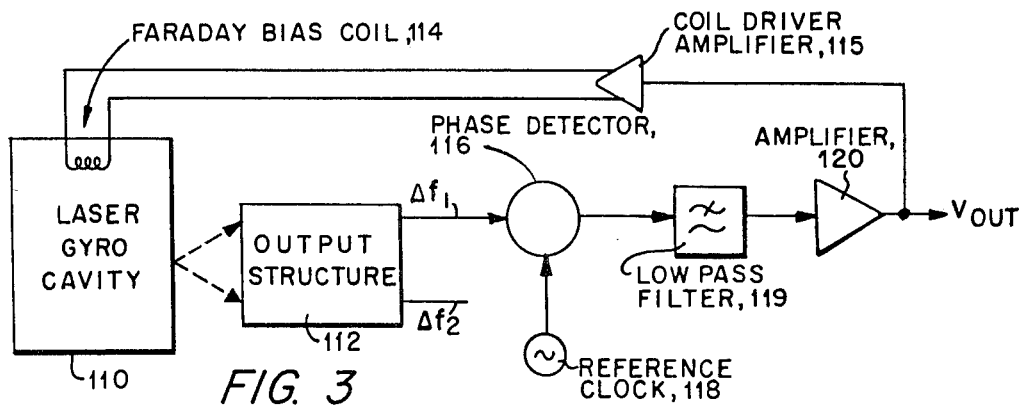

The system shown in FIG. 3 has a number of advantages over the prior art. First, there is no quantization error in the rate output signal as the rate of rotation is indicated by a highly precise analog voltage and not by the frequency of a signal which is of course subject to the quantization error. If a digital output is desired, the output signal from amplifier 120 may be digitized using an analog-to-digital converter at any desired level of precision. Secondly, with the apparatus shown in FIG. 3, there is no residual error caused by the lock-in effect because no change of frequency takes place within laser gyro cavity 110 for the signals from which the output is derived.

Figure 4:
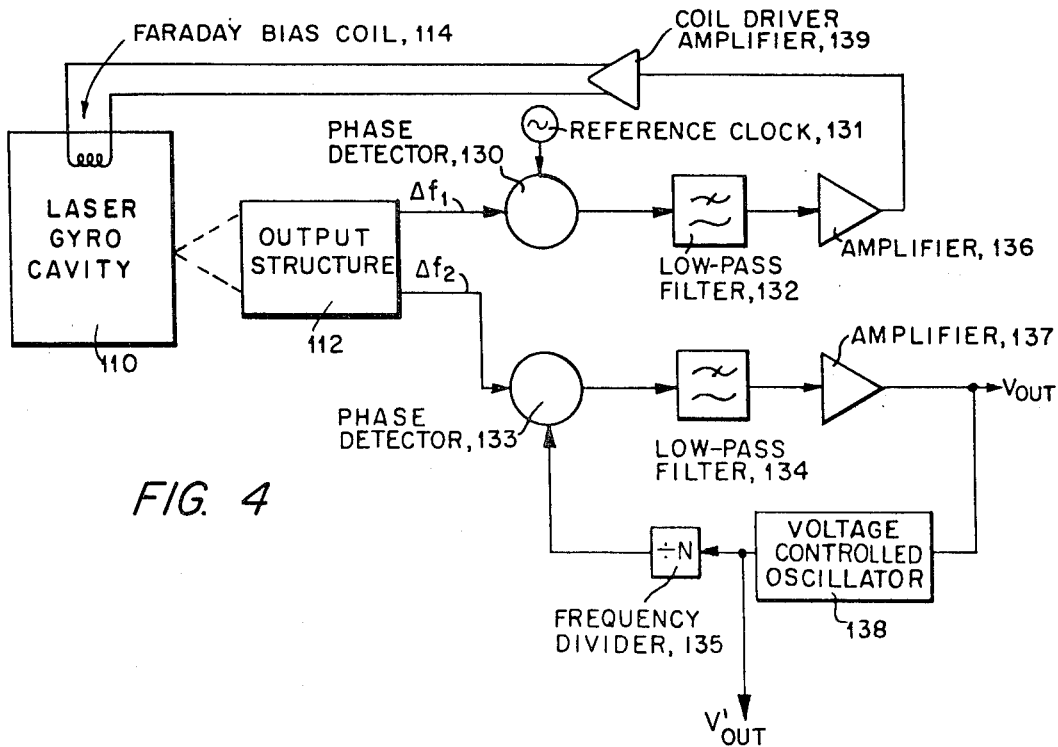

Referring next to the block diagram of FIG. 4, there is shown a further embodiment of the invention. The system shown in the embodiment of FIG. 4 operates in the same manner as that shown in FIG. 3 but with the addition of a second phase-locked loop to the system. To the $\Delta f_2$ output signal from output structure 112 is coupled to one input of second phase detector 133. A low-pass filter 134 and an amplifier 137 are coupled to the output of phase detector 133 in the same manner as the system discussed in reference to FIG. 3. To the output of amplifier 137 is coupled high precision voltage-controlled oscillator 138. The frequency of the output signal produced by voltage-controlled oscillator 138 is determined by the amplitude of the output signal from amplifier 137. Frequency divider 135 divides down the output signal from voltage-controlled oscillator 138 producing an output signal which has the same frequency as $\Delta f_2$ when the system is at rest.

With the embodiment of the invention shown in FIG. 4, the $\Delta f_1$ frequency difference is maintained at a constant value independent of the rate of rotation of the system. Because the $\Delta f_1$ signal is a constant, the $\Delta f_2$ signal will vary by twice the amount for a given rate of rotation than it would if the $\Delta f_1$ signal were also permitted to vary. Thus, the analog output signal $V_{out}$ from amplifier 137 has an amplitude twice that as would be produced in a nonphase-locked system and with no addition of noise.

Referring next to the block diagram of FIG. 5, there is shown still another embodiment of the invention. In the embodiment shown in FIG. 5, the phase-locked loop circuitry is entirely outside laser gyro cavity 110. The $\Delta f_1$ and $\Delta f_2$ signals are amplified by buffer amplifiers 141 and 142 and coupled as the two inputs to double balanced mixer 140. The output signal $\Delta f = \Delta f_2 - \Delta f_1$ from double balanced mixer 140 is of a frequency which is directly indicative of the rate of rotation of the system. However, as the $\Delta f$ signal has a typical frequency range of 100 to 500 KTz. for a typical laser gyro cavity construction, a simple digitization of the $\Delta f$ signal quantizing the signal as one counter pulse per cycle of the signal contains a large amount of quantizing error. This error is largely eliminated with this embodiment of the invention.

The DC level of the $\Delta f$ signal is set by DC restorer circuit 143 such that a zero frequency of the $\Delta f$ signal, corresponding to a zero rate of rotation of the system, produces a zero output voltage. The DC restored signal is coupled to one input of phase detector 144 which is the input point of the phase-locked loop circuitry. The output of phase detector 144 is coupled through low-pass filter 145 and amplifier 146. As in the previous embodiments, the output of amplifier 146 is coupled through voltage controlled oscillator 148 and frequency divider 147 to the second input of phase detector 144.

Two output signals are produced from the phase-locked loop. The $V_{out}$ signal from amplifier 146 in FIG. 5 and amplifier 137 in FIG. 4 is an analog signal the amplitude of which is in direct proportion to the rate of rotation of the system. This analog signal is highly precise and has no quantization error. The second output signal $V'_{out}$ is produced at the output of voltage-controlled oscillator 148 in FIG. 5 and voltage-controlled oscillator 138 in FIG. 4. The frequency of the $V'_{out}$ signal is N times that of the $\Delta f$ signal. Thus, the $V'_{out}$ signal may be digitized with a precision of N times that of a digitization of the $\Delta f$ signal. In the circuitry implementation described below, N is typically of the order of 233. Hence, it is readily appreciated that a large reduction in quantization error has been achieved with the invention.

Referring now to the view of FIG. 6, there is shown a block diagram of still another embodiment of the invention. This embodiment employs two phase-locked loop circuits producing an output signal $V_{out}$ which again has a frequency N times that of $\Delta f$. With the embodiment shown in FIG. 6, however, it is not necessary to actually produce the $\Delta f$ signal. A highly precise analog output signal $V_{out}$ is nonetheless produced in direct proportion to the rate of rotation of the system.

The Δf₁ signal from output structure 112 is coupled to the input of phase detector 151 while the Δf₂ signal is coupled to the corresponding input of phase detector 157. The outputs of phase detectors 151 and 157 are coupled through low-pass filters 152 and 156 to amplifiers 153 and 158 as in previously described embodiments. The outputs of amplifiers 153 and 158, again as in previously described embodiments, are coupled back to the inputs of phase detectors 151 and 157 through voltage-controlled oscillators 155 and 159 and frequency dividers 154 and 160.

The highly precise analog output signal $V_{out}$ is produced by forming the difference between the output signals from amplifiers 153 and 158 through difference amplifier 162. Besides providing a highly precise analog indication of the rate of rotation the polarity of the $V_{out}$ signal indicates the direction of rotation of the system.

The outputs of voltage controlled oscillators 155 and 159 are coupled to the two inputs of double balanced mixer 161. The output signal $V'_{out}$ from double balanced mixer 161 has a frequency which, as in the previously described embodiments, is in direct proportion to the rate of rotation of the system with the quantization error reduced by a factor of N.

Figure 7:
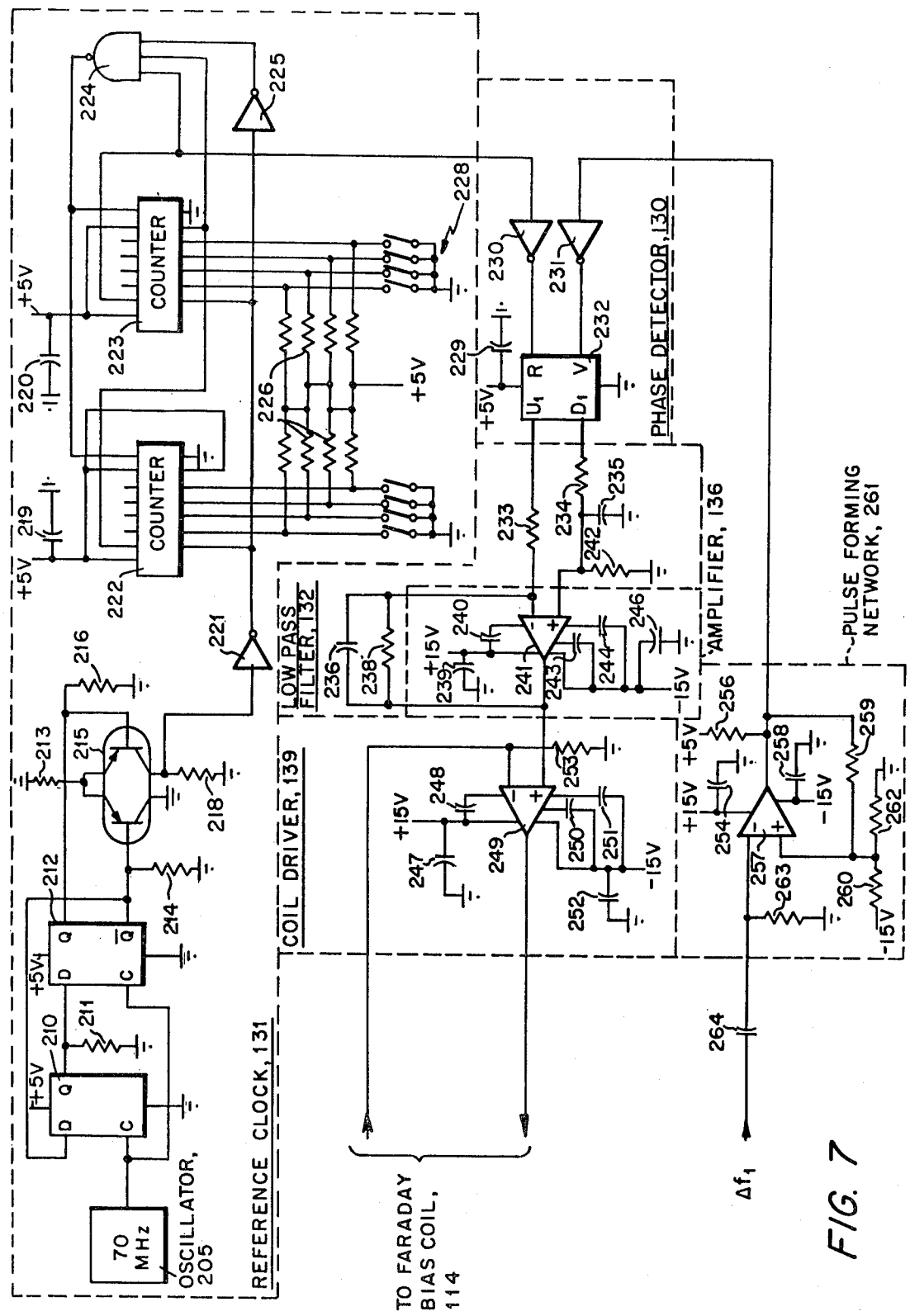
FIGS. 7 and 8 taken together are a detailed schematic diagram of the embodiment of the invention shown in FIG. 4.

In FIG. 7 is shown a schematic diagram of the phase-locked loop circuitry coupled to the Δf₁ signal. The sinusoidally shaped Δf₁ signal is coupled through capacitor 264 to pulse forming network 261 which converts the sinusoidal signal to pulse form with one pulse being generated for each cycle of the Δf₁ signal. Pulse forming network 261 is not shown in the block diagram view of FIG. 4 as it may not always be needed depending upon the form of the Δf₁ signal produced by the output structure of the gyro system. Pulse forming network 261 includes threshold detector 257 connected in a Schmidt trigger configuration so that noise present upon the Δf₁ signal does not cause false triggering.

The output of pulse forming network 261 is coupled through inverter 231 to one input of phase detector 130. Phase detector 130 is functionally implemented by integrated circuit digital phase detector 232. Integrated circuit phase detector 232 has two output lines U1 and D1. If, for example, the R input leads in phase the V input, the U1 output will remain at a fixed positive DC voltage while the D1 output will be pulsed with low going pulses of a width depending upon the phase difference. If the V input leads the R input, the D1 output will remain at the fixed positive voltage while the U1 output is pulsed.

Reference clock 131 produces a pulsed signal of controllable frequency which is coupled to the R input of phase detector 130 through inverter 230. As it is generally easier to obtain very stable frequency sources at frequencies of, for example, 50 MHz and above, a 70 MHz oscillator 205 provides the initial clock pulse source for reference clock 131. The output of oscillator 205 is coupled to the clock inputs of emitter coupled logic flip-flops 210 and 212. A divide by four function is provided by these two flip-flops. The inverted and non-inverted outputs of flip-flop 212 are coupled to the base inputs of dual transistor 215. Transistor 215 is coupled in a differential amplifier configuration and biased so as to convert the emitter coupled logic output levels from flip-flop 212 to levels acceptable for transistor-transistor logic circuitry. The output is taken across collector resistor 218 and coupled to the input of inverter 221. Inverter 221 provides clock buffering to the clock inputs of four-bit binary counters 222 and 223. Counters 222 and 223 are connected serially in a count-down configuration. Switches 227 and 228 are coupled to the preset inputs of the counters with biasing provided by resistors 226. A reset pulse for both counters 222 and 223 is produced at the output NAND gate 224 each time a count of zero is reached. The output signal to phase detector 130 is taken as the highest order bit output from counter 223. In this configuration, counters 222 and 223 provide a variable pulse frequency dividing circuit with the division factor determined by the settings of switches 227 and 228. In systems operation, switches 227 and 228 are set to provide a zero phase difference output from phase detector 130 when the system is inertially at rest.

The U1 and D1 outputs from integrated circuit phase detector 232 are coupled through resistors 223 and 234 to the inverting and noninverting inputs respectively of integrated differential amplifier circuit 241 within amplifier 136. Frequency compensation is provided to amplifier circuit 241 with capacitors 240, 243, and 244. The function of low-pass filter 132 is provided by two separate RC circuits, one formed of resistor 242 and capacitor 235, is coupled between the noninverting input of amplifier circuit 241 and ground. The other, formed of resistor 238 and capacitor 236 is coupled in a feed-back arrangement between the output and noninverting input of amplifier circuit 241. The output of amplifier circuit 241 is coupled to the input of coil driver amplifier 139 at the noninverting input of amplifier circuit 249. Faraday bias coil 114 is coupled between the output of amplifier circuit 249 and its inverting input. Frequency compensation is provided amplifier circuit 249 by capacitors 248, 250, and 251.

The operation of the Δf₂ phase-locked loop will be explained with reference to FIG. 8. The Δf₂ signal is coupled to pulse forming network 305 through capacitor 304. Pulse forming network 305 functions as in the circuit of FIG. 7. The circuitry and operation of phase detector 133 is also the same as described in conjunction with FIG. 7 as is that of low-pass filter 134 and amplifier 137.

The output of amplifier circuit 322 within amplifier 322 is coupled through resistor 338 to the control voltage input of VCO integrated circuit 340 within voltage-controlled oscillator 138. VCO circuit 340 has a 70 MHz output for a zero value of input signal. As is well known in the voltage-controlled oscillator art, the RF output of VCO circuit 340 varies in proportion to the changes in the input signal.

The output from voltage-controlled oscillator 138 is coupled to the input of frequency divider 135. Frequency divider 135 operates in the same manner as the similar circuit in FIG. 7. The value of N is set by switches 360 and 361. N is predetermined by the relationship $f_{vco}/\Delta f_2$ where Δf₂ is taken for the system at rest. For the chosen value of $f_{vco}=70$ MHz for the output frequency from voltage-controlled oscillator 138 for a zero input and for a typical value of Δf₂ of 300 KHz, N=233.

Figure 8:
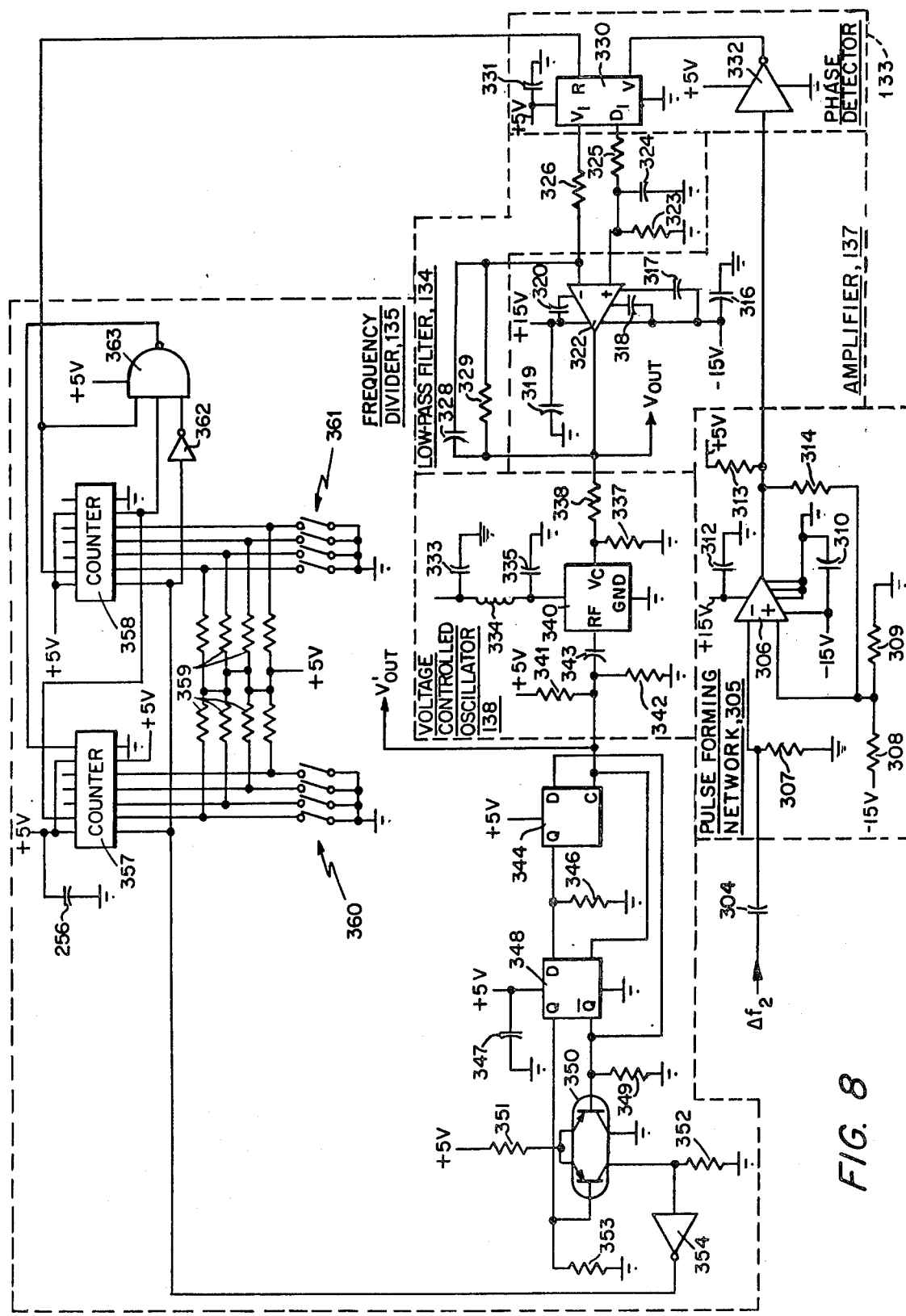

Although the circuits of FIGS. 7 and 8 have been described in conjunction with the block diagram of FIG. 4, each of the circuits of FIGS. 7 and 8 may function in the circuits indicated by the other block diagrams shown herein for the equivalent circuits indicated.

This concludes the description of the preferred embodiments of the invention. Although preferred embodiments have been described, it is believed that numerous modifications and alterations thereto would be apparent to one having ordinary skill in the art without departing from the spirit and scope of the invention.

APPENDIX

Parts List for Circuits of FIGS. 7 & 8

Resistors

| Reference | Value |
|---|---|
| 211, 214, 216, 346, 349, 353 | 560 |
| 213, 351 | 100 |
| 218, 352 | 330 |
| 226, 337, 359 | 1K |
| 233, 234, 325, 326 | 5.6K |
| 238, 242, 323, 329 | 150K |
| 253, 262, 263, 307, 309 | 10K |
| 256, 313 | 1.8K |
| 259, 314 | 220K |
| 260, 308 | 1.5M |
| 338 | 4.7K |
| 341 | 200 |
| 342 | 3.9K |

Capacitors

| Reference | Value |
|---|---|
| 219, 220, 333, 335, 347, 356 | 470 pf. |
| 240, 248, 320 | 1500 pf. |
| 235, 236, 324, 328 | 0.047 Mf. |
| 239, 243, 244, 246, 247, 250, 251, 252, 254, 258, 304, 310, 312, 316, 317, 318, 319, 331 | 0.1 Mf. |
| 264, 343 | 1000 pf. |

Coils

| Reference | Value |
|---|---|
| 114 | 35.4 turns #34 magnet wire, ½" diameter |
| 334 | 1 MH. |

Transistors

| Reference | Value |
|---|---|
| 215, 350 | 2N3810 |

Integrated Circuits

| Reference | Value |
|---|---|
| 210, 212, 357, 358 | Motorola MECL 10131 |
| 221, 225, 230, 231, 332, 354, 362 | Texas Instruments SN 74H04 |
| 222, 223, 357, 358 | Fairchild 93516DC |
| 224, 363 | Texas Instruments SN 74H10 |
| 232, 330 | Motorola MC 4344 |
| 257, 305 | National LM119 |
| 340 | Motorola K1085A-375-73-70 MHz. |

What is claimed is:

1. In combination:
  means for providing a closed-loop path for sustaining propagation of circularly polarized electromagnetic waves of a plurality of frequencies;
  means for producing a first signal having a frequency equal to the difference in frequency between two of said waves;
  means for producing a second signal having a frequency equal to a predetermined multiple of the frequency of said first signal;
  means comprising a phase detector for phase locking said second signal to said first signal;
  said second signal being coupled to the input of said phase detector through frequency dividing means; and
  the output of said phase detector being coupled to means for controlling the frequency of said means for producing said second signal.

2. The combination in accordance with claim 1 wherein:
  said waves comprise waves in or near the optical wavelength range of the electromagnetic spectrum.

3. The combination in accordance with claim 1 wherein:
  said frequency dividing means produce a signal having substantially the same frequency as said first signal.

4. In combination:
  means for providing a closed-loop propagation path for sustaining propagation of circularly polarized electromagnetic waves of at least four frequencies propagating around said path;
  means for producing a first difference signal having a frequency equal to the difference in frequency between a first two of said waves;
  means for producing a second difference signal having a frequency equal to the difference in frequency between a second two of said waves;
  means comprising phase detecting means for producing a first control signal which has a parameter determined by the difference in phase between said first difference signal and a signal having a predetermined fixed frequency;
  means for varying the frequency difference between said first two of said waves in accordance with said first control signal;
  means for producing a second control signal having an amplitude and polarity determined by the difference in phase between said second difference signal and a feedback control signal; and
  means for producing said feedback control signal in response to said second control signal, said feedback control signal having a frequency determined by said second control signal.

5. The combination of claim 4 wherein:
  said frequency difference varying means maintains said frequency difference between said first two of said waves at a constant value over at least a predetermined range of rates of rotation of said path providing means.

6. The combination of claim 4 wherein:
  first and second frequency dispersive elements are disposed in said path.

7. The combination of claim 4 wherein: a frequency dispersive element comprising a Faraday rotator body is disposed in said path; and
  said frequency difference varying means comprises a coil for producing a magnetic field in said Faraday rotator body.

8. The combination of claim 4 wherein said means for producing said first control signal and said means for producing said second control signal each comprise:
  phase detecting means having an input coupled to the corresponding difference signal producing means;
  low-pass filter means coupled to the output of said phase detecting means; and
  amplifying means coupled to the output of said low-pass filter means.

9. The combination in accordance with claim 4 wherein:
  the frequencies of said first two of said waves are either both above or both below the frequencies of said second two of said waves.

10. In combination:
  means for providing a closed-loop propagation path for sustaining propagation of electromagnetic waves of at least four frequencies;
  means for producing a first difference signal having a frequency equal to the difference in frequency between a first two of said waves;

means for producing a second difference signal having a frequency equal to the difference in frequency between a second two of said waves;

means for producing a third difference signal having a frequency equal to the difference in frequency between said first and second difference signals;

phase detecting means coupled to the output of said third difference signal producing means;

low-pass filter means coupled to the output of said phase detecting means;

amplifying means coupled to the output of said low-pass filter means; and means for producing a control signal having a frequency determined by the value of an input parameter, the input of said control signal producing means being coupled to the output of said amplifying means and the output of said control signal producing means being coupled to a second input of said phase detecting means.

11. The combination of claim 10 wherein said means for producing said third difference signal comprises:

means for amplifying said first difference signal;

means for amplifying said second difference signal; and a double balanced mixer, the amplified first and second difference signals being coupled as inputs to said mixer.

12. The combination of claim 10 wherein said control signal producing means comprises:

a voltage-controlled oscillator; and frequency dividing means coupled to the output of said voltage-controlled oscillator.

13. In combination:

means for providing a closed-loop propagation path for sustaining propagation of electromagnetic waves of at least four frequencies;

means for producing a first difference signal having a frequency equal to the difference in frequency between a first two of said waves;

means for producing a second difference signal having a frequency equal to the difference in frequency between a second two of said waves;

first and second phase-locked loops, said first phase-locked loop being coupled to said means for producing said first difference signal and said second phase-locked loop being coupled to said means for producing said second difference signal, each of said phase-locked loops comprising:

phase detecting means, the corresponding difference signal being coupled to one input of said phase detecting means;

low-pass filter means coupled to the output of said phase detecting means;

amplifying means coupled to the output of said low-pass filter means;

means for producing a control signal having a frequency determined by the value of an input parameter, the input of said control signal producing means being coupled to the output of said amplifying means, the output of said control signal producing means being coupled to a second input of said phase detecting means; and means for producing an output signal having a parameter determined by the difference in frequency between the control signals of said first and second phase-locked loops.

14. The combination of claim 13 wherein said control signal producing means of each of said first and second phase-locked loops comprises:

a voltage controlled oscillator, the input of said voltage-controlled oscillator being coupled to the output of said amplifying means and the output of said voltage-controlled oscillator being coupled to an input of said output signal producing means; and frequency dividing means, the input of said frequency dividing means being coupled to the output of said voltage-controlled oscillator and the output of said frequency dividing means being coupled to a second input of said phase detecting means.

15. The combination of claim 14 wherein:

the frequency of said output signal is equal to the difference in frequency between the output of the voltage-controlled oscillator of said first phase-locked loop and the output of the voltage-controlled oscillator of said second phase-locked loop.

16. The combination in accordance with claim 13 wherein:

said propagation path providing means comprises four or more reflecting means and first and second frequency dispersive elements.

* * * * *

UNITED STATES PATENT OFFICE
CERTIFICATE OF CORRECTION

Patent No. 4,429,997    Dated February 7, 1984

Inventor(s) James B. Matthews

It is certified that error appears in the above-identified patent and that said Letters Patent are hereby corrected as shown below:

column 5, line 12, delete "isotiopes" and replace with --isotopes--;

column 8, line 27, delete "KTz" and replace with --KHz--.

Signed and Sealed this

Twenty-second Day of May 1984

[SEAL]

Attest:

GERALD J. MOSSINGHOFF

Attesting Officer    Commissioner of Patents and Trademarks